US012639768B2

(12) United States Patent
Jones et al.

(10) Patent No.: US 12,639,768 B2
(45) Date of Patent: *May 26, 2026

(54) COMPUTER SYSTEMS AND COMPUTER-IMPLEMENTED METHODS UTILIZING SENSOR-DRIVEN DYNAMICALLY ADJUSTABLE FEEDBACK LOOPS TO MANAGE EQUIPMENT BASED RISK ON AN ASSET SPECIFIC LEVEL OF ENERGY DATA USAGE

(71) Applicant: HARTFORD STEAM BOILER INSPECTION AND INSURANCE COMPANY, Hartford, CT (US)

(72) Inventors: Richard B. Jones, Hartford, CT (US); Paul A. Cullum, Hartford, CT (US)

(73) Assignee: THE HARTFORD STEAM BOILER INSPECTION AND INSURANCE COMPANY, Hartford, CT (US)

( * ) Notice: Subject to any disclaimer, the term of this patent is extended or adjusted under 35 U.S.C. 154(b) by 291 days.

This patent is subject to a terminal disclaimer.

(21) Appl. No.: 18/071,582

(22) Filed: Nov. 29, 2022

(65) Prior Publication Data

US 2023/0177614 A1 Jun. 8, 2023

Related U.S. Application Data

(63) Continuation of application No. 16/046,976, filed on Jul. 26, 2018, now Pat. No. 11,514,527.
(Continued)

(51) Int. Cl.
*G06Q 40/08* (2012.01)
*G06N 3/04* (2023.01)
(Continued)

(52) U.S. Cl.
CPC .............. *G06Q 40/08* (2013.01); *G06N 3/04* (2013.01); *G06N 3/08* (2013.01); *G06N 20/00* (2019.01); *G06Q 10/00* (2013.01)

(58) Field of Classification Search
CPC ........ G06Q 40/08; G06Q 10/00; G06Q 50/06; G06N 20/00; G06N 3/08; G06N 3/04
See application file for complete search history.

(56) References Cited

U.S. PATENT DOCUMENTS

| | | | |
|---|---|---|---|
| 5,303,561 A | 4/1994 | Bahel | |
| 2005/0209866 A1 | 9/2005 | Veeningen | |

(Continued)

FOREIGN PATENT DOCUMENTS

| | | |
|---|---|---|
| CN | 105393274 A | 3/2016 |
| CN | 107995983 A | 5/2018 |

(Continued)

OTHER PUBLICATIONS

Brazilian Patent Office; Office Action, issued in connection to patent application No. BR112017019151-2; Jul. 13, 2020; 6 page; Brazil.
(Continued)

*Primary Examiner* — Igor N Borissov
(74) *Attorney, Agent, or Firm* — Grogan, Tuccillo & Vanderleeden, LLP

(57) ABSTRACT

In some embodiments, the present invention provides for an exemplary inventive system that may include executable program code and a computer processor which, when executing the particular program code, is configured to perform operations of: receiving, for a population of energy consuming physical assets, asset-specific historical data and asset-specific current energy consumption data from utility meter(s), sensor(s), or both; determining, for each respective physical asset category, each respective frequency of breakdowns and each respective average severity of each break-
(Continued)

down; determining, an adjusted breakdown loss value per each physical asset for each respective physical asset category; determining a respective average current energy consumption value per each physical asset for each respective physical asset category; and associating each respective energy consuming location to a particular physical asset category.

20 Claims, 8 Drawing Sheets

Related U.S. Application Data

(60) Provisional application No. 62/537,684, filed on Jul. 27, 2017.

(51) Int. Cl.
| | |
|---|---|
| *G06N 3/08* | (2023.01) |
| *G06N 20/00* | (2019.01) |
| *G06Q 10/00* | (2023.01) |

(56) References Cited

U.S. PATENT DOCUMENTS

| | | | |
|---|---|---|---|
| 2005/0209912 | A1 | 9/2005 | Veeningen |
| 2005/0228905 | A1 | 10/2005 | Veeningen |
| 2007/0043662 | A1 | 2/2007 | Lancaster |
| 2007/0199721 | A1 | 8/2007 | Givens |
| 2009/0095469 | A1 | 4/2009 | Dozier |
| 2010/0102879 | A1 | 4/2010 | Cohen |
| 2010/0324962 | A1 | 12/2010 | Nesler |
| 2011/0161133 | A1 | 6/2011 | Staveley |
| 2011/0224947 | A1 | 9/2011 | Kriss |
| 2012/0221150 | A1 | 8/2012 | Arensmeier |
| 2013/0025939 | A1 | 1/2013 | Heliot |
| 2014/0129261 | A1 | 5/2014 | Bothwell |
| 2014/0358592 | A1 | 12/2014 | Wedig |
| 2015/0052919 | A1 | 2/2015 | McGowan |
| 2015/0081221 | A1 | 3/2015 | Mancini |
| 2015/0178865 | A1 | 6/2015 | Anderson |
| 2015/0331395 | A1 | 11/2015 | Hepperla |
| 2015/0356450 | A1 | 12/2015 | Dursun |
| 2016/0187910 | A1* | 6/2016 | Moreno ................. G06Q 50/06 700/297 |
| 2016/0239342 | A1 | 8/2016 | Miry |
| 2016/0260036 | A1 | 9/2016 | Jones |
| 2017/0011318 | A1 | 1/2017 | Vigano |
| 2017/0076263 | A1 | 3/2017 | Bentz |
| 2018/0047116 | A1 | 2/2018 | Jones |
| 2019/0035028 | A1 | 1/2019 | Jones |

FOREIGN PATENT DOCUMENTS

| | | | |
|---|---|---|---|
| EA | 200700477 | A1 | 8/2007 |
| EA | 10708 | B1 | 10/2008 |
| EP | 3265647 | A0 | 1/2018 |
| JP | 2002288435 | A | 10/2002 |
| JP | 2004005371 | A | 1/2004 |
| JP | 6942239 | B2 | 9/2021 |
| RU | 2708301 | C2 | 12/2019 |
| WO | 1991013237 | A1 | 9/1991 |
| WO | 2013140239 | A1 | 9/2013 |
| WO | 2016144842 | A1 | 9/2016 |
| WO | 2019023520 | A1 | 1/2019 |

OTHER PUBLICATIONS

Brazilian Patent Office; Publication of application via the Industrial Property Gazette; RPI 2482; Jul. 31, 2018; 1 page; Brazil.

Canadian Intellectual Property Office; Examiner's Report, issued in connection to application No. 2978897; Feb. 2, 2022; 7 pages; Canada.

Canadian Intellectual Property Office; Examiner's Report, issued in connection to application No. 3071274; Mar. 25, 2021; 9 pages; Canada.

China National Intellectual Property Administration; First Office Action, issued in connection with application No. 201680026272.6; Jun. 8, 2021; 27 pages; China.

European Patent Office; Communication Pursuant to Article 94(3) EPC, issued in connection to EP16714620.8; Mar. 27, 2020; 5 pages; Europe.

European Patent Office; Extended European Search Report, issued in connection to patent application No. EP18838202.2; Nov. 9, 2020; 6 pages; Europe.

European Patent Office; PCT International Search Report, issued in connection to PCT/US2016/021105; Jun. 22, 2016; 7 pages; Europe.

European Patent Office; PCT Written Opinion of the International Searching Authority, issued in connection to PCT/US2016/021105; Jun. 22, 2016; 7 pages; Europe.

Federal Institute of Industrial Property, Official Action at the sate of the substantive examination, issued in connection to RU2017134737/03; Jun. 14, 2019; 8 pages; Russia.

Federal Institute of Industrial Property, Search Report, issued in connection to RU2017134737/03; Jun. 14, 2019; 5 pages; Russia.

Federal Institute of Industrial Property; Decision to Grant a Patent for Invention, issued in connection to RU2017134737/03; Sep. 18, 2019; 16 pages; Russia.

Intellectual Property India; Examination Report, issued in connection to application No. 202037007018; Jul. 12, 2021; 7 pages; India.

Japanese Patent Office; Notice of Reasons for Rejection, issued in connection to application No. JP2020-503989; Apr. 20, 2021; 4 pages; Japan.

Korean Intellectual Property Office; Notification of Provisional Rejection, issued in connected to application No. 10-2020-7005626; Aug. 18, 2021; 12 pages; Korea.

The International Bureau of WIPO; PCT International Preliminary Report on Patentability, issued in connection to PCT/US2016/021105; Sep. 21, 2017; 9 pages; Switzerland.

United States Patent and Trademark Office; PCT International Search Report, issued in connection to PCT/US18/43988; Nov. 2, 2018; 4 pages; US.

United States Patent and Trademark Office; PCT Written Opinion of the International Searching Authority, issued in connection to PCT/US18/43988; Nov. 2, 2018; 5 pages; US.

European Patent Office; Communication Pursuant to Article 94(3) EPC; issued in connection to patent application No. EP16714620.8; Jul. 3, 2019; 4 pages; Europe.

European Patent Office; Communication Pursuant to Article 94(3) EPC; issued in connection to patent application No. EP18838202.2; Jun. 22, 2023; 11 pages; Europe.

Korean Intellectual Property Office; Patent Rejection Decision, issued in connection to patent application No. 10-2020-7005626; Mar. 21, 2022; 2 pages; Korea.

* cited by examiner

| Asset Class | STEP 410 | | STEP 420 | STEP 430 | | | STEP 440 | |
| | Number of Insureds | Number of Assets | Total Loss Amounts by Category | Number of Claims | Claim Frequency | Avg. Claim Severity | Loss Costs ($/Asset) | Base Rate Multiplier | Adjusted Loss Costs ($/Asset) |
|---|---|---|---|---|---|---|---|---|---|
| Air Conditioning Systems | 8,900 | 8,900 | $1,714,376 | 208 | 2.34% | $8,231.90 | $192.63 | 1.47 | $283.16 |
| Magnetic Resonance Imaging (MRI) machines | 1,975 | 3,950 | $19,898,326 | 72 | 1.83% | $275,276.00 | $5,037.55 | 2.05 | $10,326.98 |
| Retail Stores | 23,138 | 72,653 | $21,767,288 | 3,131 | 4.31% | $6,951.39 | $299.60 | 1.23 | $368.51 |

*FIG. 4*

Step 510

Generate Energy Consumption Data

Step 520

| Asset Category | Energy Customer by Customer Type | Total Energy Consumption by Customer (kwh) | Number of Assets |
|---|---|---|---|
| Air Conditioning | AC #174 | 26,986 | 2 |
| Air Conditioning | AC #2392 | 53,972 | 4 |
| Air Conditioning | AC #2652 | 13,493 | 1 |
| Air Conditioning | AC #657 | 40,479 | 3 |
| MRI | MRI #183 | 8,762 | 1 |
| MRI | MRI #263 | 17,524 | 2 |
| MRI | MRI #308 | 8,762 | 1 |
| MRI | MRI #90 | 8,762 | 1 |
| Retail Stores | Retail Store #31357 | 179,190 | 33 |
| Retail Stores | Retail Store #29708 | 298,650 | 55 |
| Retail Stores | Retail Store #32964 | 65,160 | 12 |
| Retail Stores | Retail Store #21241 | 141,180 | 26 |

Step 530

| Customer Mapped to Business Category or Asset Class | Total Energy Consumption by Asset Category (kwh) | Number of Assets | Average Energy Consumption per Asset Category (E) |
|---|---|---|---|
| Air Conditioning | 134,930 | 10 | 13,493 |
| MRI | 43,810 | 5 | 8,762 |
| Retail Stores | 684,180 | 126 | 5,430 |

*FIG. 5*

| STEP 610 | | STEP 620 | | STEP 630 | |
| --- | --- | --- | --- | --- | --- |
| Asset Category | Energy Customer by Customer Type | Total Energy Consumption by Customer (kwh) | Adjusted Loss Costs ($/Asset) | Asset Category | Asset Energy Risk Scale Factor: α |
| Air Conditioning | AC #174 | 26,986 | $283.16 | Air Conditioning | 0.80 |
| Air Conditioning | AC #2392 | 53,972 | $283.16 | MRI | 0.97 |
| Air Conditioning | AC #2652 | 13,493 | $283.16 | Retail Stores | 1.00 |
| Air Conditioning | AC #657 | 40,479 | $283.16 | | |
| MRI | MRI #183 | 8,762 | $10,326.98 | | |
| MRI | MRI #263 | 17,524 | $10,326.98 | | |
| MRI | MRI #308 | 12,324 | $10,326.98 | | |
| MRI | MRI #90 | 3,967 | $10,326.98 | | |
| Retail Stores | Retail Store #16148 | 179,190 | $368.51 | | |
| Retail Stores | Retail Store #2422 | 298,650 | $368.51 | | |
| Retail Stores | Retail Store #1440 | 65,160 | $368.51 | | |
| Retail Stores | Retail Store #27115 | 141,180 | $368.51 | | |

*FIG. 6*

| Asset Category | Energy Customer by Customer Type | Total Energy Consumption by Customer (kwh) | Adjusted Loss Costs ($/Asset) | STEP 710 | | |
| --- | --- | --- | --- | --- | --- | --- |
| | | | | Scale Factor: α | Normalization Factor | Insurance Premium |
| Air Conditioning | AC #174 | 26,986 | $283.16 | 0.80 | 1.02 | $501.74 |
| Air Conditioning | AC #2392 | 53,972 | $283.16 | 0.80 | 1.02 | $873.57 |
| Air Conditioning | AC #2652 | 13,493 | $283.16 | 0.80 | 1.02 | $288.17 |
| Air Conditioning | AC #657 | 40,479 | $283.16 | 0.80 | 1.02 | $693.98 |
| MRI | MRI #183 | 8,762 | $10,326.98 | 1.20 | 0.97 | $10,053.36 |
| MRI | MRI #263 | 17,524 | $10,326.98 | 1.20 | 0.97 | $23,096.55 |
| MRI | MRI #308 | 12,324 | $10,326.98 | 1.20 | 0.97 | $15,138.73 |
| MRI | MRI #90 | 3,967 | $10,326.98 | 1.20 | 0.97 | $3,884.56 |
| Retail Stores | Retail Store #16148 | 179,190 | $368.51 | 1.00 | 1.00 | $12,160.96 |
| Retail Stores | Retail Store #2422 | 298,650 | $368.51 | 1.00 | 1.00 | $20,268.27 |
| Retail Stores | Retail Store #1440 | 65,160 | $368.51 | 1.00 | 1.00 | $4,422.17 |
| Retail Stores | Retail Store #27115 | 141,180 | $368.51 | 1.00 | 1.00 | $9,581.36 |

*FIG. 7*

COMPUTER SYSTEMS AND COMPUTER-IMPLEMENTED METHODS UTILIZING SENSOR-DRIVEN DYNAMICALLY ADJUSTABLE FEEDBACK LOOPS TO MANAGE EQUIPMENT BASED RISK ON AN ASSET SPECIFIC LEVEL OF ENERGY DATA USAGE

CROSS-REFERENCE TO RELATED APPLICATIONS

This application is a continuation application and claims the benefit, and priority benefit of U.S. patent application Ser. No. 16/046,976, filed Jul. 26, 2018, which claims the benefit and priority benefit of U.S. Provisional Patent Application Ser. No. 62/537,684 filed Jul. 27, 2017, the contents of each are herein incorporated by reference for all purposes.

BACKGROUND OF THE INVENTION

The present era of computing has introduced an array of small devices that perform a variety of specific functions. For example, sensors or sensor devices are undergoing significant advances in structure and low power technology. In some applications, sensors may utilize micro-electromechanical systems, or MEMS, technology. Sensors may include more than one component, such as an embedded processor, digital storage, power source, a transceiver, and an array of sensors, environmental detectors, and/or actuators. In some cases, sensors may rely on small batteries, solar-powered cell, or ambient energy for power, and run for long periods of time without maintenance. In some applications, sensors may reside within or be attached to one or more units of equipment and be tasked with collecting data regarding one or more operational and/or environmental conditions of the associated equipment.

FIELD OF THE INVENTION

In some embodiments, the present invention is directed to computer systems and computer-implemented methods utilizing sensor-driven dynamically adjustable feedback loops to manage equipment operation based on an asset specific level of energy usage.

BRIEF SUMMARY OF THE INVENTION

In some embodiments, and, optionally, in combination of any embodiment described above or below, the present invention provides for an exemplary inventive computer-implemented method that includes at least the steps of: receiving, by at least one processor, for a pre-determined time period, at least the following for a population of energy consuming physical assets: i) asset-specific historical data, including: 1) asset-specific historical energy consumption data, 2) at least one first asset-specific historical operational characteristic, 3) at least one first asset-specific historical environmental characteristic, and 4) first asset-specific historical breakdown loss data; and ii) asset-specific current energy consumption data from at least one utility meter, at least one sensor, or both; determining, by the at least one processor, for each respective physical asset category, a respective frequency of breakdowns and a respective average severity of each breakdown based, at least in part, on the asset-specific historical data; determining, by the at least one processor, an adjusted breakdown loss value per each physical asset for each respective physical asset category based, at least in part, on the respective frequency of breakdowns and the respective average severity of each breakdown; determining, by the at least one processor, a respective average current energy consumption value per each physical asset for each respective physical asset category based, at least in part, on the asset-specific current energy consumption data; associating, by the at least one processor, each respective energy consuming location, representing at least one energy consuming physical asset of the population of energy consuming physical assets, to a particular physical asset category; determining, by the at least one processor, for each respective energy consuming location, a particular usage-based breakdown insurance premium value based, at least in part, on: i) a number of the at least one energy consuming physical asset of the population of energy consuming physical assets in each respective physical asset category associated with a respective energy consuming location and ii) the respective average current energy consumption value per each physical asset for each respective physical asset category; generating, by the at least one processor, based, at least in part, on the particular usage-based breakdown insurance premium value of the respective energy consuming location, at least one alert to at least one of: i) at least one service provider that services the at least one energy consuming physical asset, ii) at least one electronic device of at least one entity associated with the at least one energy consuming physical asset, iii) the at least one sensor, or iv) the at least one energy consuming physical asset; and where the at least one electronic alert is configured to affect the location-specific level of energy usage of the at least one energy consuming physical asset by at least one of: i) requiring a new usage-based breakdown insurance premium value or a change in the usage-based breakdown insurance premium value, ii) causing at least one user associated with the at least one energy consuming physical asset to change a level of energy usage of the at least one energy consuming physical asset, iii) instructing the at least one user to adjust at least one operational characteristic of the at least one energy consuming physical asset, iv) instructing the at least one user to adjust at least one environmental characteristic of the at least one energy consuming physical asset, and v) instructing the at least one user to adjust at least sensor operational parameter of the at least one sensor.

In some embodiments, and, optionally, in combination of any embodiment described above or below, the at least one energy consuming physical asset is a physical configuration including one or more units of equipment (UOEs). In some embodiments, and, optionally, in combination of any embodiment described above or below, the at least one historical environmental characteristic is at least one of: at least one optical parameter, at least one acoustic parameter, at least one pressure parameter, at least one temperature parameter, at least one acceleration parameter, at least one magnetic parameter, at least one biological parameter, at least one chemical parameter, or at least one motion parameter. In some embodiments, and, optionally, in combination of any embodiment described above or below, the at least one optical parameter is selected from the group consisting of an infrared light parameter, a visible light parameter, and an ultraviolet light parameter. In some embodiments, each respective energy consuming location is defined based on a Global Positioning System (GPS) data identifying a physical location of the at least one energy consuming physical asset. In some embodiments, the at least one sensor is one of: i) a liquid pressure sensor, ii) a liquid flow rate sensor, iii) a temperature sensor, iv) a gas flow rate sensor, v) a gas pressure sensor, or vi) an electrical system sensor.

In some embodiments, and, optionally, in combination of any embodiment described above or below, the step of associating, by the at least one processor, each respective energy consuming location to the particular physical asset category, further including: classifying, by the at least one processor, the one or more UOEs of the respective energy consuming location into the particular physical asset category. In some embodiments, and, optionally, in combination of any embodiment described above or below, the classifying the one or more UOEs of the respective energy consuming location into the particular physical asset category includes: applying, by the at least one processor, at least one machine learning technique that has been trained to classify physical assets based, at least in part, on Standard Industrial Classification (SIC) codes.

In some embodiments, and, optionally, in combination of any embodiment described above or below, the asset-specific historical energy consumption data and the asset-specific current energy consumption data are in kilowatt-hours (kwh). In some embodiments, and, optionally, in combination of any embodiment described above or below the converting, by the at least one processor, the asset-specific historical energy consumption data and the asset-specific current energy consumption data into respective kwh amount.

In some embodiments, and, optionally, in combination of any embodiment described above or below, the present invention provides for an exemplary inventive system that may include at least the following components: at least one specialized computer, including: a non-transient computer memory, storing particular computer executable program code; and at least one computer processor which, when executing the particular program code, is configured to perform at least the following operations: receiving, for a pre-determined time period, at least the following for a population of energy consuming physical assets: i) asset-specific historical data, including: 1) asset-specific historical energy consumption data, 2) at least one first asset-specific historical operational characteristic, 3) at least one first asset-specific historical environmental characteristic, and 4) first asset-specific historical breakdown loss data; and ii) asset-specific current energy consumption data from at least one utility meter, at least one sensor, or both; determining, for each respective physical asset category, a respective frequency of breakdowns and a respective average severity of each breakdown based, at least in part, on the asset-specific historical data; determining, an adjusted breakdown loss value per each physical asset for each respective physical asset category based, at least in part, on the respective frequency of breakdowns and the respective average severity of each breakdown; determining a respective average current energy consumption value per each physical asset for each respective physical asset category based, at least in part, on the asset-specific current energy consumption data; associating each respective energy consuming location, representing at least one energy consuming physical asset of the population of energy consuming physical assets, to a particular physical asset category; determining, for each respective energy consuming location, a particular usage-based breakdown insurance premium value based, at least in part, on: i) a number of the at least one energy consuming physical asset of the population of energy consuming physical assets in each respective physical asset category associated with a respective energy consuming location and ii) the respective average current energy consumption value per each physical asset for each respective physical asset category; generating, based, at least in part, on the particular usage-based breakdown insurance premium value of the respective energy consuming location, at least one alert to at least one of: i) at least one service provider that services the at least one energy consuming physical asset, ii) at least one electronic device of at least one entity associated with the at least one energy consuming physical asset, iii) the at least one sensor, or iv) the at least one energy consuming physical asset; and where the at least one electronic alert is configured to affect the location-specific level of energy usage of the at least one energy consuming physical asset by at least one of: i) requiring a new usage-based breakdown insurance premium value or a change in the usage-based breakdown insurance premium value, ii) causing at least one user associated with the at least one energy consuming physical asset to change a level of energy usage of the at least one energy consuming physical asset, iii) instructing the at least one user to adjust at least one operational characteristic of the at least one energy consuming physical asset, iv) instructing the at least one user to adjust at least one environmental characteristic of the at least one energy consuming physical asset, and v) instructing the at least one user to adjust at least sensor operational parameter of the at least one sensor.

BRIEF DESCRIPTION OF THE DRAWINGS

These and further features will be apparent with reference to the following description and drawings, wherein like structures are referred to by like numerals throughout the several views. The drawings shown are not necessarily to scale, with emphasis instead generally being placed upon illustrating the principles of the present invention. Further, some features may be exaggerated to show details of particular components. Therefore, specific structural and functional details disclosed herein are not to be interpreted as limiting, but merely as a representative basis for teaching one skilled in the art to variously employ the present invention.

FIGS. 1-7 illustrate certain aspects of the instant invention in accordance with at least some embodiments of the instant invention.

DETAILED DESCRIPTION OF THE EMBODIMENTS OF THE INVENTION

Figure 1:
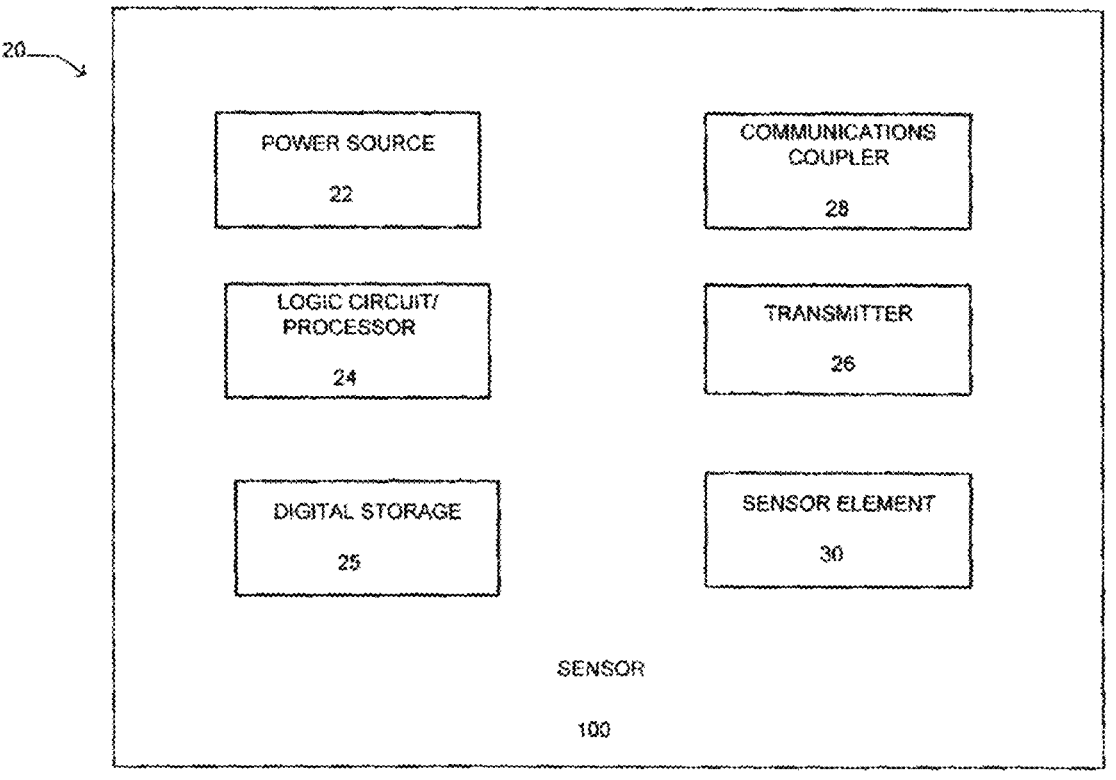

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Any alterations and further modifications of the inventive feature illustrated herein, and any additional applications of the principles of the invention as illustrated herein, which would normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "runtime" corresponds to any behavior that is dynamically determined during an execution of a software application or at least a portion of software application.

As used herein, the term "dynamic (ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the inventive electronic systems are associated with electronic mobile devices (e.g., smartphones, sensors, etc.) and server(s) in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments, a plurality of concurrent network participants (e.g., sensors, servers, units of equipment, etc.) can be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript, Python, Perl,). The aforementioned examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In one example implementation, a multi-processor system may include a plurality of processor chips each of which includes at least one I/O component which is designed to directly connect to photonic components to connect to at least an I/O device. In some embodiments, the I/O device may be a standard interface, such as peripheral component interconnect express (PCIe), universal serial bus (USB), Ethernet, Infiniband, and the like. In some embodiments, the I/O device may include a storage device.

In one example implementation, a multi-processor system may include plurality of photonic components and an off-chip memory. The off-chip memory may be shared by more than one of the processor chips. The off-chip memory may be directly connected to a single processor chip and shared with other processor chips using a global memory architecture implemented by using a processor-to-processor approach. The multi-processor system may also include a cache and a plurality of processor chips each of which includes at least one I/O component which is designed to directly connect to the photonic components to communicate with one or more other processor chips. At least one I/O component of at least one of the processor chips may be configured to use a directory-based cache-coherence protocol. In some embodiments, a cache of at least one of the processor chips may be configured to store directory information. In some embodiments, the off-chip memory may include a DRAM. In some embodiments, directory information may be stored in the off-chip memory and the on-chip cache of at least one of the processor chips. In some embodiments, the multi-processor system may further include a directory subsystem configured to separate the off-chip memory data and the directory information on to two different off-chip memories.

In some embodiments, the multi-processor system may further include a directory subsystem configured with some of the subsystem implemented on a high-performance chip which is part of the 3D DRAM memory stack. In some embodiments, the multi-processor system may further include a directory subsystem configured to support varying numbers of sharers per memory block. In some embodiments, the multi-processor system may further include a directory subsystem configured to support varying numbers of sharers per memory block using caching. In some embodiments, the multi-processor system may further include a directory subsystem configured to support varying numbers of sharers per memory block using hashing to entries with storage for different numbers of pointers to sharers. In some embodiments, the multi-processor system may further include a directory subsystem configured to use hashing to reduce storage allocated to memory blocks with zero sharers.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

FIG. 1 illustrates an exemplary sensor 20, many of which can be combined to form an exemplary sensor network. In some embodiments, the exemplary sensor 20 may be of various sizes, and may be as small as a quarter coin, or smaller, as sensor sizes are now in the millimeter range. In some embodiments, the sensor 20 may include a power source 22, a logic circuit/microprocessor 24, a storage device 25, a transmitter (or transceiver) 26, a communications coupler 28 coupled to the transmitter 26, and a sensor element 30. In some embodiments, the sensor may be unpowered or passive, drawing its power from a reader or another source.

In some embodiments, the power source 22 may provide power to the sensor 20. For example, the power source 22 may include a battery, a solar-powered cell, and/or a continuous power supply furnished by an external power source, such as by connection to a power line. By way of example, the storage device 25 may include any computer readable media, such as volatile and/or nonvolatile media, removable and/or non-removable media, for storing computer data in permanent or semi-permanent form, and can be implemented with any data storage technology. In some embodiments, the storage device 25 may store data in a form that can be sampled or otherwise converted into a form storable in a computer readable media.

In some embodiments, the exemplary transmitter 26 may be configured to only transmit a data signal. In some embodiments the transmitter 26 both may be configured to receive and transmit data signals (transceiver). In some embodiments, as referenced herein, a "data signal" may include, for example and without limitation, a current signal, voltage signal, magnetic signal, and/or optical signal in a format capable of being stored, transferred, combined, compared, and/or otherwise manipulated. In some embodiments, the transmitter 26 may include wireless, wired, infrared, optical, and/or other communications techniques, for communication with a central computing device or central station, one or more units of equipment, and/or optionally other sensors, using the communications coupler 28. In some embodiments, the communications coupler 28 may include an antenna for wireless communication, a connection for wired connection, and/or an optical port for optical communication.

In some embodiments, the exemplary sensor 20 may include any type of data processing capacity, such a hardware logic circuit, for example an application specific integrated circuit (ASIC) and a programmable logic, or such as a computing device, for example, a microcomputer or microcontroller that include a programmable microprocessor. In some embodiments, the embodiment of the sensor 20 illustrated in FIG. 1 may include data-processing capacity provided by the microprocessor 24. In some embodiments, the microprocessor 24 may include memory, processing, interface resources, controllers, and counters. In some embodiments, the microprocessor 24 may also include one or more programs stored in memory to operate the sensor 20. If an embodiment uses a hardware logic circuit, the logic circuit generally includes a logical structure that operates the sensor 20.

In some embodiments, the sensor 20 may include one or more sensor elements 30 that may be configured to detect at least one of a parameter of an environment in which the sensor associated with one or more units of equipment is located and at least one operational characteristic of one or more associated units of equipment. In some embodiments, for example, without any limitation, the exemplary sensor element 30 may detect at least one parameter from a group of optical, acoustic, pressure, temperature, thermal, acceleration, magnetic, biological, chemical, and motion parameters. In some embodiments, the optical parameter may include at least one from a group consisting of infrared, visible, and ultraviolet light parameters. For example and without limitation, the sensor element 30 may include a photo sensor to detect a level or change in level of light, a temperature sensor to detect temperature, an audio sensor to detect sound, and/or a motion sensor to detect movement. In some embodiments, the sensor element 30 may include a digital image capture device, such as for example and without limitation, a CCD or CMOS imager that captures data related to infrared, visible, and/or ultraviolet light images.

In some embodiments, the exemplary sensor elements 30 may be configured to output a data signal representative of at least one detected condition. In some embodiments, the sensor 20 may automatically acquire data related to a parameter of the sensor environment, and transmit data to a central computing device. For example, the sensor element 30 in a form of an acoustic sensor may acquire sound levels and frequencies, and transmit the data related to the levels and frequencies along with a time track using the transmitter 26 and the communication coupler 28. In some embodiments, the acquisition may be on any time basis, such as in real-time, continuously, intermittently, sporadically, occasionally, and upon request. In some embodiments, the time track may be provided elsewhere, such as a device that receives the sensor data.

By way of further example and without limitation, the sensor element 30 may be in a form of an optical digital camera that may periodically acquire visual images, such as for example, once each second, and to transmit the data related to visual images along with a time track. In some embodiments, the sensor element 30 may be in the form of a temperature sensor may detect temperature changes in pre-determined-degree temperature intervals (e.g., 2 seconds, 5 seconds, 10 second, etc.), and to transmit each two-degree temperature change along with the time it occurred. Each of the above examples illustrates a sequence, ranging from continuous for acoustical detection to a per occurrence basis for two-degree temperature changes.

In some embodiments, the sensor element 30 may also sense operational parameters of the sensor 20 itself, such as, without limitation, its battery/power level or its radio signal strength. In some embodiments, sensor data, including a data related to a sensed parameter, is transmitted from the sensor 20 in any signal form via the transmitter 26 and the communications coupler 28, to a receiver. The receiver may be, for example, another sensor 20, a central computing device, or any other data receiver. The sensor data may include a time and/or date that the data related to a parameter was acquired.

In some embodiments, the sensor 20 may be associated with a unique identifier, and is operable to communicate the unique identifier in an association with its sensed parameter. In some embodiments, the sensor 20 may include a configuration that determines its location, for example, by a Global Positioning System (GPS), by triangulation relative to a known point, or by communication with other sensors. In some embodiments, the location of the sensor 20 may be a known parameter established previously. Similarly, location identification may be associated with data originated and/or forwarded by the sensor.

In some embodiments, the exemplary sensor 20, by itself and/or in a group of similarly suitable sensors, may be configured to accomplish a range of tasks, including high level tasks. In some embodiments, exemplary tasks may include operations such as general information gathering, security monitoring, industrial monitoring, biomedical monitoring, and other similar tasks. As referenced herein, the terms "monitoring" and "controlling", as well as their permutations and synonyms, include, without limitation, task(s) such as sending out instructions to adjust operational behavior of one or more associated units of equipment.

In some embodiments, the exemplary sensor 20 and the similarly suitable sensors may be located inside a building (e.g., home, office, industrial plant, etc.). For example, the location specific sensory data generated by the exemplary sensor 20 and the similarly suitable sensors may be indicative of particular operational and/or environmental conditions related to an operation of one or more UOEs located inside and/or outside of a relevant building and/or a set of buildings. For example, the location specific sensory data may include data related to, without limitation, times when various lights are turned on, intensity settings of lights, general electricity consumption, electricity per UOE consumption, general water consumption, water per UOE consumption, general natural gas consumption, natural gas per UOE consumption, etc. For example, the exemplary sensor 20 and the similarly suitable sensors may be of one or more of the following types (but are not limited to):

i) a liquid (e.g., water) pressure sensor—detects liquid pressure (e.g., water pressure) at various locations within the structure; for example, water pressure sensors may be placed anywhere inside or outside the structure and thus may provide information related to the stresses being induced upon the structure's plumbing system (including sewer lines, water lines, HVAC system, appliances, and automatic fire suppression systems);

ii) a liquid (e.g., water) flow rate sensor—detects the amount and/or rate of liquid (e.g., water) flowing through selected points in the plumbing system (including sewer lines, water lines, HVAC system, appliances, and automatic fire suppression systems); for example, water flow rate sensor may be placed anywhere inside or outside the structure and thus may provide information related to the amount of water being routed to the structure, and more particularly, which parts of the structure are receiving exactly (or approximately) how much water;

iii) an electrical system sensor—electrical system sensor detects the operational parameters of the structure's electrical system; readings from the electrical system sensor could be used to determine at least one of, without limitation: 1) if the voltage is (persistently) too high or too low, 2) if the voltage frequently drops and/or spikes, 3) current flowing through the electrical system, 4) level of energy use and at what times of day, and etc.;

iv) a temperature sensor;

v) a gas flow rate sensor, or vi) a gas pressure sensor.

Figure 2:
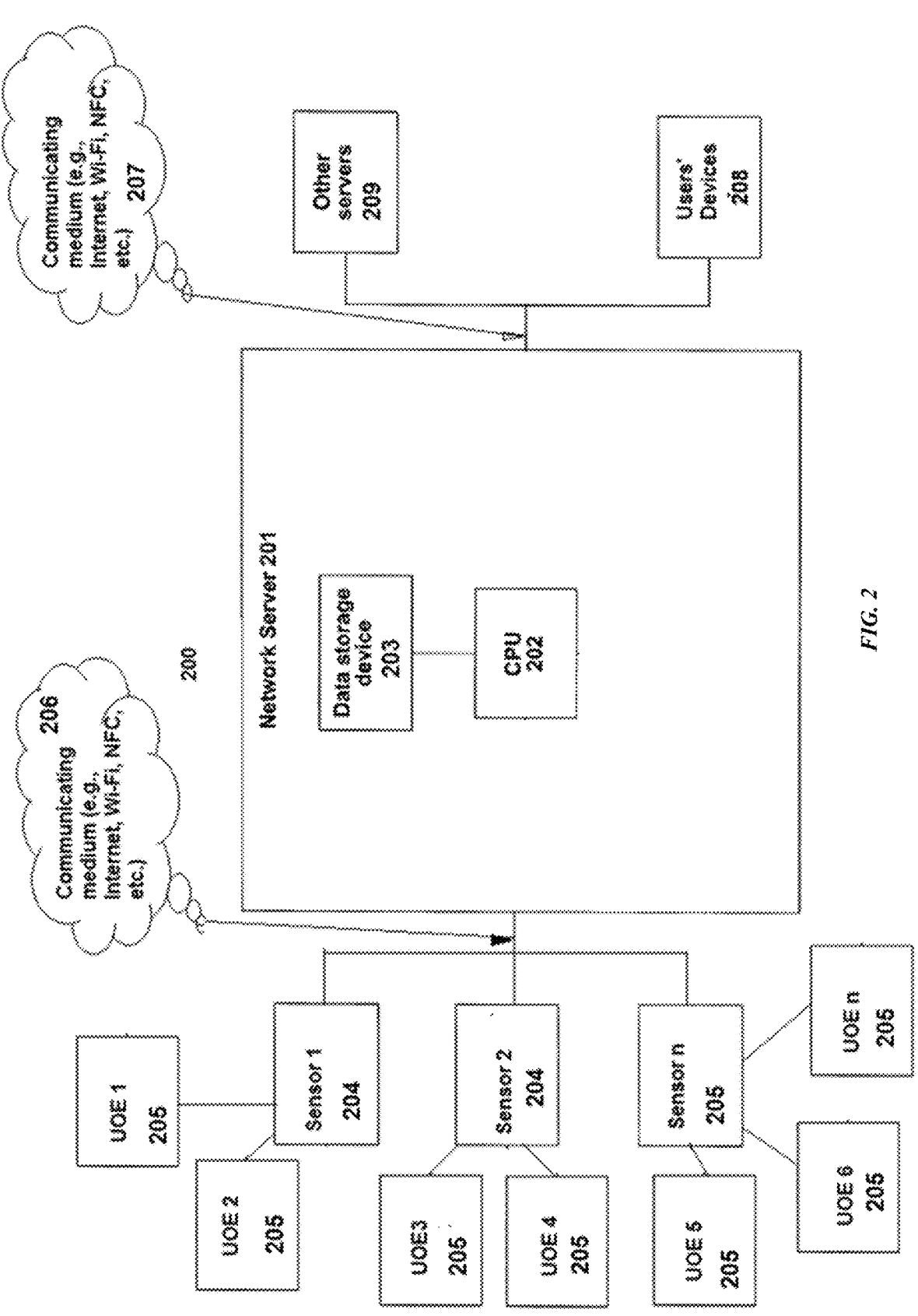

FIG. 2 is a block diagram of an exemplary computing architecture 200 suitable for implementing at least some embodiments of the present invention. For example, an exemplary network server 201 can at least include at least one central processing unit (CPU) 202 and one or more databases or data storage devices 203. The network server 201 may be configured in many different ways. In some embodiments, the exemplary network server 201 may be a standalone computer or alternatively, the function of exemplary network server 201 may be distributed across multiple computing systems and architectures. For example, the exemplary network server 201 may be configured in a distributed architecture, wherein databases and processors are housed in separate units and/or locations.

In some embodiments, the exemplary computing architecture 200 may be configured to utilize any wired and wireless types integrated in a networked environment to exchange data at least between various sensors 1-n, 204, units of equipment ("UOEs") 1-n, 205, other servers/computer systems, 209, and/or users' devices, 208 (e.g., computer, laptop, smartphone, etc.). In some embodiments, the exemplary network server 201 may be configured/programmed to utilize one or more communication protocols, 206 and 207, to exchange data at least between various sensors 1-n, 204, units of equipment ("UOEs") 1-n, 205, other servers/computer systems, 209, and/or users' devices, 208 (e.g., computer, laptop, smartphone, etc.). In some embodiments, an exemplary communications protocol may be, but not limited to: Ethernet, SAP, SAS™, ATP, BLUETOOTH™, GSM, TCP/IP, LAN, WAN, Wi-Fi, 802.11X, 3G, LTE, Near-field communication (NFC) and any other similarly suitable communication protocol. In some embodiments, each member device of the exemplary computing architecture 200 may also have an associated IP address.

In some embodiments, the at least one data storage device 203 may include an appropriate combination of magnetic, optical and/or semiconductor memory, and may include, for example, RAM, ROM, flash drive, an optical disc such as a compact disc and/or a hard disk or drive. In some embodiments, the CPU 202 and the data storage device 203 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing.

In some embodiments, the data storage device 203 may store, for example, (i) a program (e.g., computer program code and/or a computer program product) adapted to direct the CPU 202 in accordance with the present invention, and particularly in accordance with the processes described in detail hereinafter with regard to the CPU 202; (ii) databases adapted to store information that may be utilized to store information required by the program. In some embodiments, the program may be stored, for example, in a compressed, an un-compiled and/or an encrypted format, and may include computer program code. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software. In some embodiments, suitable computer program code that may be executed by the network server 201 may be programmed to cause the network server 201 to perform numerous functions such as, but not limited to, safety data processing and/or insurance policy administrative functions.

In some embodiments, as shown in FIG. 2, when executing an exemplary insurance policy administrative application, the exemplary network server 201 may be part of one or more sensor-driven dynamically adjustable feedback loops to manage equipment (e.g., UOEs 1-n, 205) based on a location specific level of energy usage. For example, as shown in FIG. 2, the exemplary sensors 1-n, 204, may at least collect various environmental and/or operational parameters related to the exemplary UOEs 1-n, 205 and transmit the collected sensory data to the exemplary network server 201 via one or more communication media/protocols, 206. In some embodiments, the exemplary environmental and/or operational parameters of the sensory data are related to a location specific level of energy usage by the exemplary UOEs 1-n, 205. In some embodiments, when executing an exemplary insurance policy administrative application, the exemplary network server 201 may utilize the exemplary sensory data, including the location specific level of energy usage by the exemplary UOEs 1-n, 205, to determine one or more data values related to asset breakdown estimation (asset breakdown estimation values). In some embodiments, when executing the exemplary insurance policy administrative application, based, at least in part, on at least one equipment breakdown estimation value for at least one particular UOE, the exemplary network server 201 may be programmed to determine insurance data for insuring the at least one particular UOE and/or one or more UOEs which may or may not be controlled by the same entity. In some embodiments, the insurance data may include location-specific insurance premium data such as, but not limited to, a current location-specific insurance premium, and/or a change in location-specific insurance premium over an existing insurance premium. In some embodiments, the exemplary network server 201 may be programmed to generate at least one electronic alert to at least one of:

i) one or more other servers/computer systems 209 (e.g., service providers' servers/computer systems that service one or more UOEs 1-n, 205);

ii) one or more various users' electronic devices 208 (e.g., electronic devices of insured entities);

iii) one or more sensors 1-n, 204;

iv) one or more exemplary UOEs 1-n, 205; or v) any combination thereof.

In some embodiments, the at least one electronic alert may be configured to at least provide information about the new insurance premium and/or the change in the insurance premium. In some embodiments, the at least one electronic alert may be configured to cause at least one insurer associated with one or more UOEs related to the at least one electronic alert to affect the location specific level of energy usage of the one or more UOEs. In some embodiments, the at least one electronic alert may be configured to include at least one instruction to adjust at least one of at least one operational parameter of the one or more sensors 1-n, 204 and at least one operational parameter of one or more exemplary UOEs 1-n, 205, as to affect at least one of collecting sensory data regarding the location specific level of energy usage of the one or more UOEs and at least one mode of operation of the one or more UOEs.

In some embodiments, when executing then exemplary inventive insurance policy administrative application, the exemplary network server 201 may be configured to generate, in real-time, an electronic operational alert, identifying that the exemplary network server 201 ceased to receive data from the one or more sensors 1-n, 204.

In some embodiments, when executing the exemplary inventive insurance policy administrative application, the exemplary network server 201 may be configured to apply, in real-time, one or more machine learning techniques, as detailed herein, to the received data (e.g., the asset-specific historical data, the current energy consumption data, breakdown frequency, etc.) to accomplish, for example, without limitation, one or more of the following: predictively generate alerts in real time, reduce the possibility of equipment breakdowns, reduce usage-based breakdown insurance premium, etc.

Figure 3A:
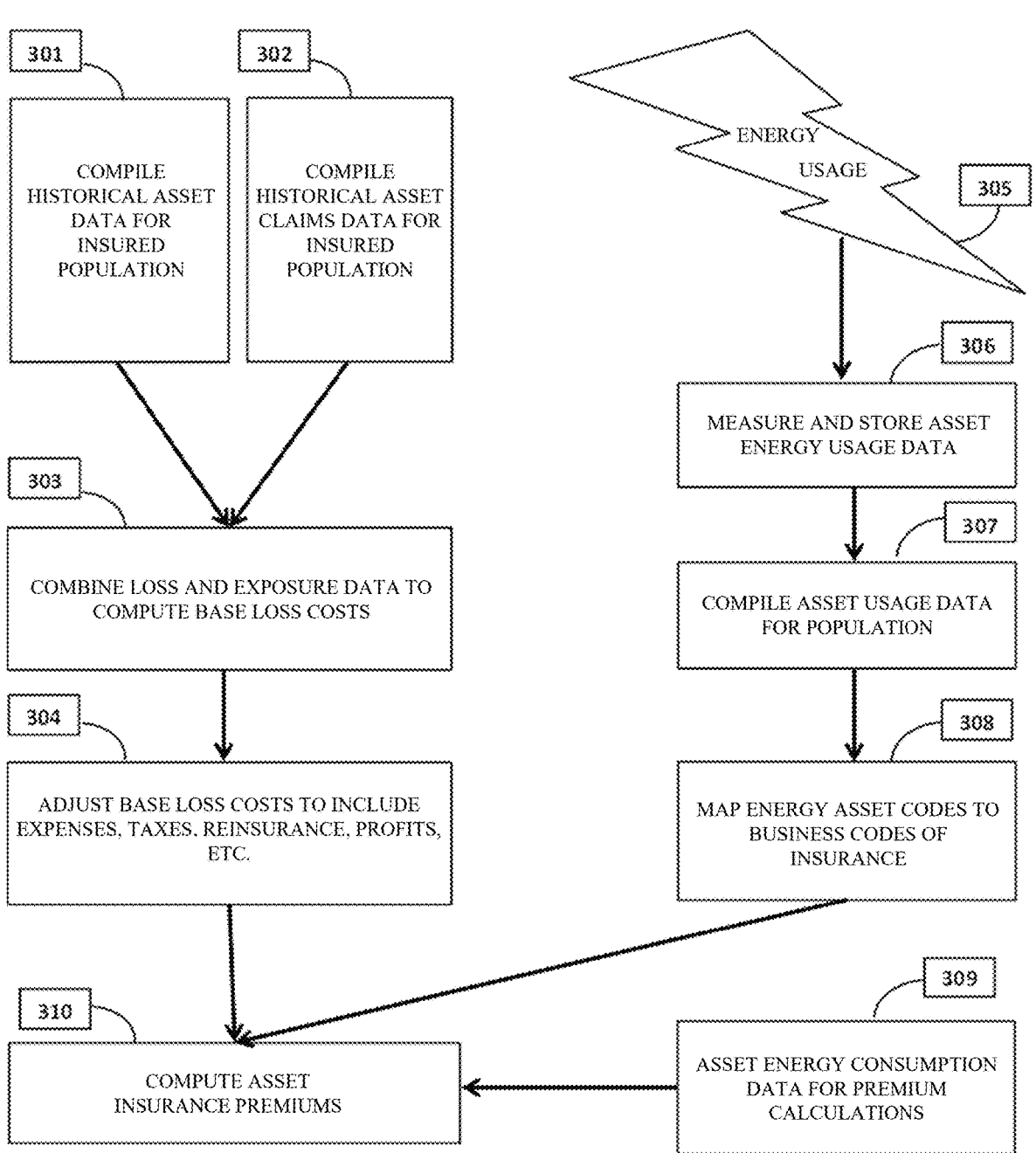
Figure 3B:
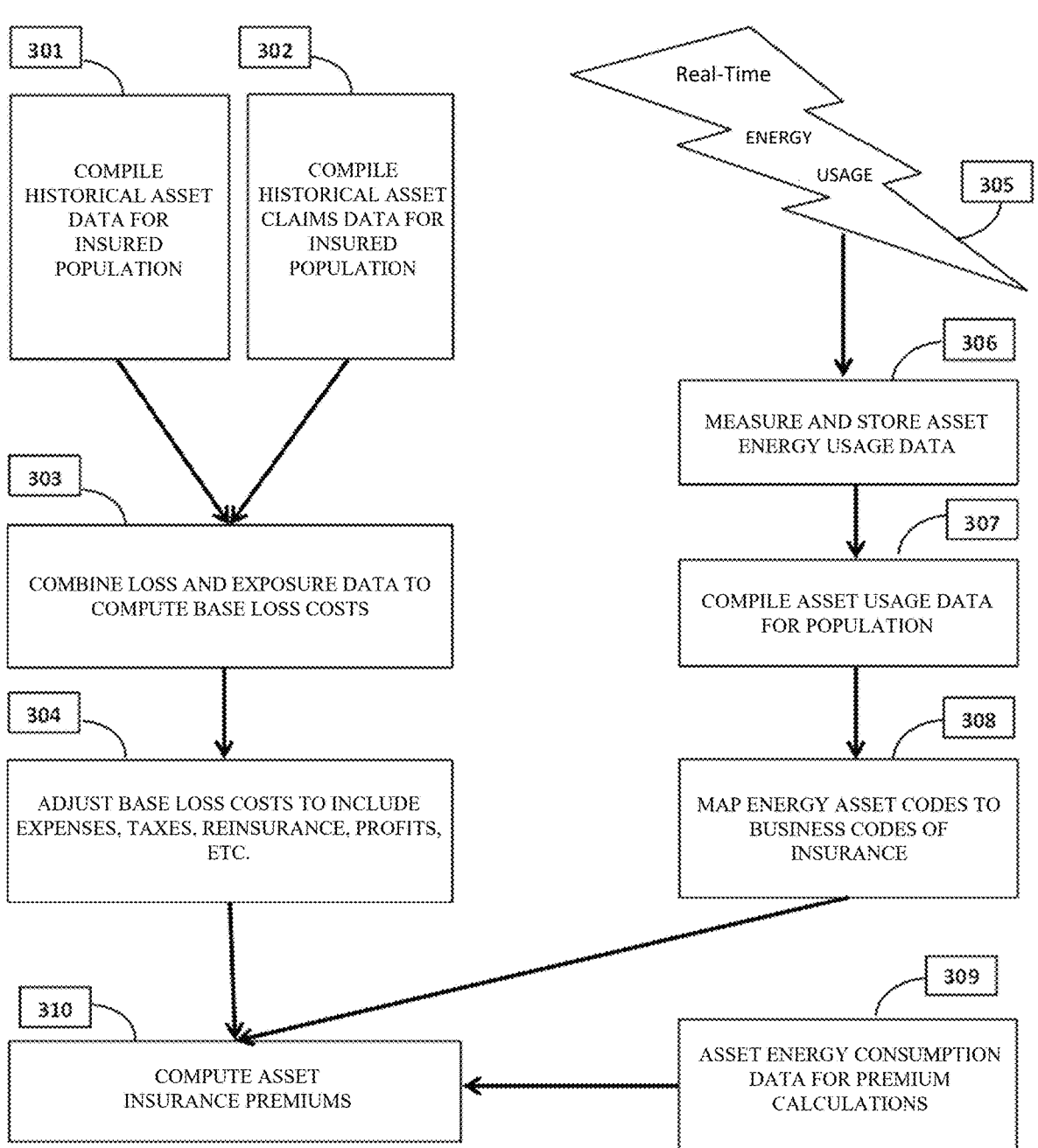

FIGS. 3A and 3B are exemplary flowcharts of exemplary inventive processes for exemplary insurance policy administrative application being executed at the exemplary network server 201, as shown in FIG. 2 in accordance with at least some embodiments of the present invention. In some embodiments, the exemplary inventive process is directed to determining the energy usage-based premium data which may be utilized in the exemplary sensor-driven dynamically adjustable feedback loop for managing the equipment (e.g., UOEs 1-n, 205) such as, without limitation, in determining at least one of whether certain equipment or systems would breakdown or fail and when the breakdown and/or failure would likely occur. In some embodiments, the exemplary inventive process may be applied to one or more physical locations or at any level that has energy consumption metering or sensor recordings. In some embodiments, the exemplary insurance policy administrative application may be configured/programmed to utilize energy usage-based premium data to determine a usage based insurance premium for the locations, systems and/or equipment (e.g., UOEs 1-n, 205).

In FIGS. 3A and 3B, step 301 relates to an energy consuming physical asset that may be an energy consuming physical configuration being rated for an insurance premium (e.g., one or more UOEs). In some embodiments, an exemplary physical configuration could be a geographical location or locations that have a common function (e.g., apartments), a physical system inside a location (e.g. HVAC), and/or an individual piece of equipment, e.g. MRI machines. For example, without limitation, each asset's energy usage could be obtained from one or more utility meters and/or from sensors installed on the asset to measure energy usage data. In some embodiments, asset-level energy usage data is compiled for a specified historical period suitable for gathering a sufficient population for computing meaningful statistics and short enough to represent future exposures. For example, without limitation, for this discussion, without a limitation, a period of five years is used. In addition to energy consumption, step 301 collects standard asset characteristics about each asset's environment. For example, its size, type of commercial business, address, and/or other data related to the asset's size and/or operational characteristics. At step 302, claims data is collected that includes the same data elements as in step 301, but in addition includes, without limitation, asset-specific loss data about the location, equipment and/or systems that have failed, cause(s) of loss, and loss amount. At step 303, the data sources developed at steps 301 and 302 are combined to compute claim frequencies (e.g., frequency of breakdown/deficiency) and claim severities (e.g., severity of breakdown/deficiency). For example, this may be accomplished by applying the following formulas (1) and (2):

$$\text{Claim Frequency:} f = \frac{\text{\# of claims}}{\text{\# of insured assets}}, \qquad (1)$$

$$\text{Claim Severity:} S = \frac{\sum \text{Asset loss amounts}}{\text{\# of claims}} \qquad (2)$$

and

These calculations are performed for previously specified data subsets of the exposure and loss data bases to compute claim frequencies and severities for each subset. In some embodiments, these data categorizations are based, at least in part, on the nature of the commercial businesses in the collected data. Other embodiments are based on physical systems e.g., HVAC, refrigeration, lighting, heating, cooling, etc. And other embodiments could be based on specific equipment, e.g. chillers, boilers, motors, engines, etc. A subset could be defined for geographic regions, type of business, size, days of operation. In some embodiments, the claim frequencies, f, and severities, S, are multiplied together to compute each subset's base loss costs, R, for asset insurance as shown in the following formula (3):

$$R\left(\frac{\text{loss amount}}{\text{insured asset}}\right) = f\left(\frac{\text{\# of claims}}{\text{\# of insured assets}}\right) * S\left(\frac{\text{loss amount}}{\text{\# of claims}}\right) \qquad (3)$$

In FIGS. 3A and 3B, a step 304, the exemplary insurance policy administrative application may be configured/programmed to adjust the base loss costs to include standard insurance-related business costs including, without limitation, overhead, claim administration, commissions, and/or reinsurance. In some embodiments, the exemplary insurance policy administrative application may be configured/programmed to compute these expenses via standard accounting procedures and add them to the base premium loss costs to ensure a viable business activity. In some embodiments, the expense charges applied may vary by subset group as defined in step 303.

In some embodiments, the exemplary insurance policy administrative application may be configured/programmed to execute a parallel process path starting in step 305, energy usage data is generated at the asset. In FIG. 3A, the energy usage data 305 is generated on any time basis, such as in real-time, continuously, intermittently, sporadically, occasionally, and upon request. In FIG. 3B, the energy usage data 305 is generated in real-time. For example, the asset's actual/current energy usage could be obtained from one or more utility meters or from sensors installed on the asset to measure energy and/or usage. In some embodiments, this energy usage could be, without limitation, in terms of diesel fuel gallons, cubic feet of natural gas, kilowatt hours, kilowatts, and/or other energy usage units. In step 306, the exemplary insurance policy administrative application may be configured/programmed to store energy use data regarding the energy used over a specific time period which may be received, for example, from at least one of the exemplary sensors 1-n, 204 (e.g., customer installed energy meters), the exemplary UOEs 1-n, 205 (e.g., utility itself), and one or more electronic sources associated with one or more third parties. In some embodiments, the exemplary insurance policy administrative application may be configured/programmed to group the energy use data to represent total usage for location, system, or individual piece of equipment. In step 307, for each site in a population, the exemplary insurance policy administrative application may be configured/programmed to obtain the energy use data and stored the energy use data as a population level database. Along with the energy use data, the exemplary insurance policy administrative application may be configured/programmed to obtain attributes of the site including, without limitation, data pertaining to the site's location, size, and/or business activity. In step 308, the exemplary insurance policy administrative application may be configured/programmed to convert or map the collected site and customer level data to exemplary asset-level codes that may be used to describe asset insurance risk used in steps 301 through 304 so that the energy use data can mapped/categorized with the same subset criteria as performed in steps 301 through 304. This mapping is used to transform both the population level energy data from step 307 and customer energy data for pricing in step 309. For example, site street addresses and zip codes may be mapped to pre-defined geographical regions for modeling asset risk. Also, business activities, routinely described in terms of Standard Industrial Classification (SIC) codes, may require mapping asset risk occupancy codes. This step ensures the energy data can be mapped/categorized with the same subset criteria as performed in steps 301 through 304.

In step 309, the exemplary insurance policy administrative application may be configured/programmed to compile a specific set of customer data that mapped to asset-level class variables (using the results of step 308) and energy consumption data to determine an energy usage-based premium for asset breakdown insurance. If multiple energy sources are being consumed at a site, the exemplary insurance policy administrative application may be configured/programmed to utilize at least one standard energy conversion factor to convert all energy consumption to kilowatt-hours.

In step 310, the data results from steps 304, 308 are applied to the customer data entered in step 309. The exemplary insurance policy administrative application may be configured/programmed to compute the usage-base premium from the following equation (4) below for each asset class-based customer listed in step 309. In some embodiments, the exemplary insurance policy administrative application may be configured/programmed to utilize other suitable criteria. Then, the exemplary insurance policy administrative application may be configured/programmed to determine the summation and totals over each of the identified subset criteria (e.g., region-size-business).

In step 310 each asset's insurance premium, $P_i$, is computed from the product adjusted base costs and the quotient of specific asset's energy consumption, $E_i$, to the asset class's average energy consumption raised to the a power:

$$P_i = m * K * R * \left(\frac{E_i}{\bar{E}}\right)^{\alpha} \quad (4)$$

where $\bar{E}$=average energy consumption computed over the asset population:

$$\bar{E} = \frac{\sum \text{Energy consumption}(kwh)}{\text{Total number of assets}}$$

$\alpha$is the asset class energy scale factor determined by the insurer
m is computed in step 304,
K is constant to normalize rates to produce the same overall population premium and
R is the base loss cost computed in step 303.

The constant, K, is included to ensure that the total premium for a given business category or asset class remains constant in relation to a. If a given book of business is underwritten to yield a given amount of premium, the choice of scaling factor should not change this amount. Moreover, from an insurance regulatory perspective, if standard rates are approved by state regulators then the book of business premium needs be held constant, i.e., independent of the scaling factor. Holding the total business category or asset class premium constant, K can be computed as:

$$K = N^{1-\alpha} * \frac{\left(\sum_1^N E_i\right)^{\alpha}}{\sum_1^N E_i^{\alpha}} \quad (5)$$

where N is the population size.

The scale factor, a, is chosen by the insurer. Its value is based on insurance data, engineering data, and experience with the particular asset class being underwritten. It can vary for a wide range of reasons. For example, if $\alpha=1$, doubling an asset's energy usage also doubles the insurance premium. This linearity could describe insurance exposures where changes in energy usage are directly related to number of equipment counts or changes in operating hours. But for other cases, insurance risk is not necessarily linear with energy usage. For example, if $\alpha=\frac{1}{2}$, then doubling the energy usage only increases the insurance rate by approximately 40%−($\sqrt{2}\approx1.41$). This approach may be valid for customers who replace several operating units with larger, more energy efficient items. In other embodiments, different values could be used and in fact $\alpha>1$ values may be appropriate for some asset classes. For example, high value equipment could reflect higher costs due to their unique technology, with higher business interruption values. The value of a selected reflects the insurer's data and experience of how asset class risk varies with energy consumption.

As examples of the exemplary inventive methods described in FIGS. 3A and 3B, FIGS. 4-7 show how the exemplary insurance policy administrative application may be configured/programmed to compute, for example, in real time, energy usage-based premiums for a given geographic region for customers that fall into three exemplary asset classes.

In FIG. 4, at step 410, the exemplary insurance policy administrative application electronically obtains historical exposure data per certain asset class examples: retail locations, Air conditioning systems, and the equipment asset class: Magnetic Resonance Imaging (MRI) machines. At step 420, the exemplary insurance policy administrative application electronically obtains historical data regarding historical asset claims data for insured population. At step 430, the exemplary insurance policy administrative application dynamically combines loss and exposure data from, steps 410 and 420 to compute base loss costs. At step 440, the exemplary insurance policy administrative application dynamically adjusts the base loss costs by predetermined multipliers which may be determined or calculated based, at least in part, on historical data to account for various additional items, such as, but not limited to, asset class characteristics, expenses, reinsurance, profits, etc.

In FIG. 5, at step 510, the exemplary insurance policy administrative application electronically obtains energy data from, for example, without limitation, at least one of (1) one or more utility meters, (2) one or more sensors, or (3) one or more electronic databases to generate energy consumption data for the insured asset populations being priced. For example, at step 520, the exemplary insurance policy administrative application electronically determines the energy consumption data for four insureds for each of three assets classes. This data is compiled for a given period of time similar to what is usually done to determine sufficient exposure and loss data for pricing regular insurance products. At step 530, the exemplary insurance policy administrative application generates the average energy consumption statistics, $(\bar{E}_i)$, for the particular insured population, i, for each asset class across all insured asset classes In FIG. 6, at step 610, the exemplary insurance policy administrative application maps pricing customer's ID (e.g, Retail Store #1234) to its asset class. At step 620, the exemplary insurance policy administrative application links each pricing customer's ID its energy consumption and asset class adjusted base loss costs computed at step 440. At step 630, the exemplary insurance policy administrative application utilizes an insurer supplied table that contains the scale factors ($\alpha_k$) for the asset classes being used in the premium calculations.

In FIG. 7, at step 710, the exemplary insurance policy administrative application computes the customer insurance premiums using the tabulated data and equations (4) and (5).

In some embodiments, the exemplary insurance policy administrative application may be configured/programmed to determine a total for a representative customer's energy use over all locations and also over all fuels. For example, a business could use natural gas for heating in addition to its electricity consumption. In such case, the exemplary insurance policy administrative application may be configured/programmed to utilize, for example, a particular conversion of 100 ft$^3$ of natural gas to be equivalent to 29.21 kwh to add the natural gas usage equivalent in Kwh to the electrical consumption In some embodiments, the exemplary insurance policy administrative application may be configured/programmed to utilize other kwh equivalents conversion factors for different fuels. In some embodiments, the exemplary insurance policy administrative application may be configured/programmed to apply the energy conversion calculation over the complete energy data population of customers and compile the generated energy conversion data into a database which may be a separate or integral with one or more other databases detailed herein. In some embodiments, the exemplary insurance policy administrative application may be configured/programmed to apply the adjusted equipment insurance pricing model to new insurance customers' energy consumption data in supporting the exemplary inventive sensor-driven dynamically adjustable feedback loop for managing the equipment (e.g., UOEs 1-n, 205) based on the asset specific level of energy usage. For example, the exemplary insurance policy administrative application may be configured/programmed to map name(s) of new customer (s) and total energy consumption (measured in kwh) to an insurance business category. Then, the exemplary insurance policy administrative application may be configured/programmed to determine the new customers' asset breakdown premium for the individual policies based, at least in part, on the combination of corresponding rating information and the customer's energy usage.

In some embodiments and, optionally, in combination of any embodiment described above or below, the exemplary insurance policy administrative application may be configured/programmed to apply, in real-time, one or more machine learning techniques (e.g. neural networks, support vector machines, decision trees, random forests, boosting, nearest neighbor algorithms, Naive Bayes, bagging, etc.) to, for example without limitation, to classify assets based on at least one of location(s), system(s), equipment(s), or one or more other suitable asset classification criteria/categories that can be learned or trained to learn (i.e., optionally without the exemplary analysis detailed herein) from, for example without limitation, at least one of the asset-specific historical data or asset-specific current energy consumption data.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model, ii) Transfer the sensor data to the exemplary neural network model, iii) Train the exemplary model incrementally, iv) determine the accuracy for a specific number of timesteps, v) apply the exemplary trained model to process the newly-received sensor data, vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments and, optionally, in combination of any embodiment described above or below, an exemplary connection data for each connection in the exemplary neural network may include at least one of a node pair or a connection weight. For example, if the exemplary neural network includes a connection from node N1 to node N2, then the exemplary connection data for that connection may include the node pair <N1, N2>. In some embodiments and, optionally, in combination of any embodiment described above or below, the connection weight may be a numerical quantity that influences if and/or how the output of N1 is modified before being input at N2. In the example of a recurrent network, a node may have a connection to itself (e.g., the connection data may include the node pair <N1, N1>).

In some embodiments and, optionally, in combination of any embodiment described above or below, the exemplary trained neural network model may also include a species identifier (ID) and fitness data. For example, each species ID may indicate which of a plurality of species (e.g., asset classification categories) the exemplary model is classified in. For example, the fitness data may indicate how well the exemplary trained neural network model models the input asset energy consumption data set and/or asset breakdown loss data set. For example, the fitness data may include a fitness value that is determined based on evaluating the fitness function with respect to the model. For example, the exemplary fitness function may be an objective function that is based on a frequency and/or magnitude of errors produced by testing the exemplary trained neural network model on the input asset energy consumption data set and/or asset breakdown loss data set. As a simple example, assume the input asset energy consumption data set and/or asset breakdown loss data set each includes ten rows, that the input asset energy consumption data set and/or asset breakdown loss data set each includes two columns denoted A and B, and that the exemplary trained neural network model outputs a predicted value of B given an input value of A. In this example, testing the exemplary trained neural network model may include inputting each of the ten values of A from each of the input asset energy consumption data set and/or asset breakdown loss data set, comparing the predicted values of B to the corresponding actual values of B from each respective the input asset energy consumption data set and/or asset breakdown loss data set, and determining if and/or by how much the two predicted and actual values of B differ. To illustrate, if a particular neural network correctly predicted the value of B for nine of the ten rows, then the exemplary fitness function may assign the corresponding model a fitness value of 9/10=0.9. It is to be understood that the previous example is for illustration only and is not to be considered limiting. In some aspects, the exemplary fitness function may be based on factors unrelated to error frequency or error rate, such as number of input nodes, node layers, hidden layers, connections, computational complexity, etc.

In some embodiments and, optionally, in combination of any embodiment described above or below, the exemplary neural network model receives input asset energy consumption and/or asset breakdown loss values at input layer. In some embodiments and, optionally, in combination of any embodiment described above or below, the exemplary trained neural network model then propagates those values through connections to a particular layer. In some embodiments and, optionally, in combination of any embodiment described above or below, each of the connections may include a numerical weighting value (e.g., a value between −1 and 1) that is used to modify the original value (e.g., propagated value-original value*weight). In some embodiments and, optionally, in combination of any embodiment described above or below, nodes of the particular layer receive these propagated values as input. In some embodiments and, optionally, in combination of any embodiment described above or below, each node of the particular layer may include a function that combine the received input values (e.g., summing all received inputs). For example, each node may further contain one or more activation functions that determines when a value would be output on a connection of connections to the subsequent layer (e.g., output +1 if the combined value of the inputs is >0 and output −1 if the combined value of the inputs is <0, and output 0 if the combined value of the inputs is =0). Each node of an exemplary output layer may correspond to a predefined category for the input sensor values. For example, the combined input sensor values for each node of the output layer may determine a category determined for the input (e.g., the category for the output node that has the largest combined input values). In some embodiments and, optionally, in combination of any embodiment described above or below, in this way, the exemplary neural network structure may be used to determine, for example, one or more asset classification categories for the input asset energy consumption data set and/or asset breakdown loss data set.

In some embodiments and, optionally, in combination of any embodiment described above or below, weights for connections may be provided with default and/or random values to start. In some embodiments and, optionally, in combination of any embodiment described above or below, the sensor inputs are then provided to the exemplary neural network model through the input layer, and the determined categories for the asset energy consumption and/or asset breakdown loss input values (e.g., based on highest combined input values at the nodes of output layer) may be observed and compared to the correct categories as previously labeled. In some embodiments and, optionally, in combination of any embodiment described above or below, the weights for connections may be repeatedly modified until the exemplary neural network model correctly determines the correct categories for all of the inputs, or at least for an acceptable portion of all of the inputs, to result in the exemplary trained neural network model.

For example, when a new input is received without a correct category previously determined, the exemplary inventive computer-based system of the present invention may be configured to submit that input to the exemplary trained neural network model to determine the most likely category for that input.

In some embodiments and, optionally, in combination of any embodiment described above or below, the exemplary neural network model may be further optimized, in real-time, by, for example but not limited to, reducing a number of nodes, reducing a number of connections, reducing a file size of a file storing parameters defining the neural network model, or any combination thereof.

In some embodiments, and, optionally, in combination of any embodiment described above or below, the present invention provides for an exemplary inventive computer-implemented method that includes at least the steps of: receiving, by at least one processor, for a pre-determined time period, at least the following for a population of energy consuming physical assets: i) asset-specific historical data, including: 1) asset-specific historical energy consumption data, 2) at least one first asset-specific historical operational characteristic, 3) at least one first asset-specific historical environmental characteristic, and 4) first asset-specific historical breakdown loss data; and ii) asset-specific current energy consumption data from at least one utility meter, at least one sensor, or both; determining, by the at least one processor, for each respective physical asset category, a respective frequency of breakdowns and a respective average severity of each breakdown based, at least in part, on the asset-specific historical data; determining, by the at least one processor, an adjusted breakdown loss value per each physical asset for each respective physical asset category based, at least in part, on the respective frequency of breakdowns and the respective average severity of each breakdown; determining, by the at least one processor, a respective average current energy consumption value per each physical asset for each respective physical asset category based, at least in part, on the asset-specific current energy consumption data; associating, by the at least one processor, each respective energy consuming location, representing at least one energy consuming physical asset of the population of energy consuming physical assets, to a particular physical asset category; determining, by the at least one processor, for each respective energy consuming location, a particular usage-based breakdown insurance premium value based, at least in part, on: i) a number of the at least one energy consuming physical asset of the population of energy consuming physical assets in each respective physical asset category associated with a respective energy consuming location and ii) the respective average current energy consumption value per each physical asset for each respective physical asset category; generating, by the at least one processor, based, at least in part, on the particular usage-based breakdown insurance premium value of the respective energy consuming location, at least one alert to at least one of: i) at least one service provider that services the at least one energy consuming physical asset, ii) at least one electronic device of at least one entity associated with the at least one energy consuming physical asset, iii) the at least one sensor, or iv) the at least one energy consuming physical asset; and where the at least one electronic alert is configured to affect the location-specific level of energy usage of the at least one energy consuming physical asset by at least one of: i) requiring a new usage-based breakdown insurance premium value or a change in the usage-based breakdown insurance premium value, ii) causing at least one user associated with the at least one energy consuming physical asset to change a level of energy usage of the at least one energy consuming physical asset, iii) instructing the at least one user to adjust at least one operational characteristic of the at least one energy consuming physical asset, iv) instructing the at least one user to adjust at least one environmental characteristic of the at least one energy consuming physical asset, and v) instructing the at least one user to adjust at least sensor operational parameter of the at least one sensor.

In some embodiments, and, optionally, in combination of any embodiment described above or below, the at least one energy consuming physical asset is a physical configuration including one or more units of equipment (UOEs). In some embodiments, and, optionally, in combination of any embodiment described above or below, the at least one historical environmental characteristic is at least one of: at least one optical parameter, at least one acoustic parameter, at least one pressure parameter, at least one temperature parameter, at least one acceleration parameter, at least one magnetic parameter, at least one biological parameter, at least one chemical parameter, or at least one motion parameter. In some embodiments, and, optionally, in combination of any embodiment described above or below, the at least one optical parameter is selected from the group consisting of an infrared light parameter, a visible light parameter, and an ultraviolet light parameter. In some embodiments, and, optionally, in combination of any embodiment described above or below, each respective energy consuming location is defined based on a Global Positioning System (GPS) data identifying a physical location of the at least one energy consuming physical asset. In some embodiments, the at least one sensor is one of: i) a liquid pressure sensor, ii) a liquid flow rate sensor, iii) a temperature sensor, iv) a gas flow rate sensor, v) a gas pressure sensor, or vi) an electrical system sensor.

In some embodiments, and, optionally, in combination of any embodiment described above or below, the step of associating, by the at least one processor, each respective energy consuming location to the particular physical asset category, further including: classifying, by the at least one processor, the one or more UOEs of the respective energy consuming location into the particular physical asset category. In some embodiments, and, optionally, in combination of any embodiment described above or below, the classifying the one or more UOEs of the respective energy consuming location into the particular physical asset category includes: applying, by the at least one processor, at least one machine learning technique that has been trained to classify physical assets based, at least in part, on Standard Industrial Classification (SIC) codes.

In some embodiments, and, optionally, in combination of any embodiment described above or below, the asset-specific historical energy consumption data and the asset-specific current energy consumption data are in kilowatt-hours (kwh). In some embodiments, and, optionally, in combination of any embodiment described above or below, the converting, by the at least one processor, the asset-specific historical energy consumption data and the asset-specific current energy consumption data into respective kwh amount.

In some embodiments, and, optionally, in combination of any embodiment described above or below, the present invention provides for an exemplary inventive system that may include at least the following components: at least one specialized computer, including: a non-transient computer memory, storing particular computer executable program code; and at least one computer processor which, when executing the particular program code, is configured to perform at least the following operations: receiving, for a pre-determined time period, at least the following for a population of energy consuming physical assets: i) asset-specific historical data, including: 1) asset-specific historical energy consumption data, 2) at least one first asset-specific historical operational characteristic, 3) at least one first asset-specific historical environmental characteristic, and 4) first asset-specific historical breakdown loss data; and ii) asset-specific current energy consumption data from at least one utility meter, at least one sensor, or both; determining, for each respective physical asset category, a respective frequency of breakdowns and a respective average severity of each breakdown based, at least in part, on the asset-specific historical data; determining, an adjusted breakdown loss value per each physical asset for each respective physical asset category based, at least in part, on the respective frequency of breakdowns and the respective average severity of each breakdown; determining a respective average current energy consumption value per each physical asset for each respective physical asset category based, at least in part, on the asset-specific current energy consumption data; associating each respective energy consuming location, representing at least one energy consuming physical asset of the population of energy consuming physical assets, to a particular physical asset category; determining, for each respective energy consuming location, a particular usage-based breakdown insurance premium value based, at least in part, on: i) a number of the at least one energy consuming physical asset of the population of energy consuming physical assets in each respective physical asset category associated with a respective energy consuming location and ii) the respective average current energy consumption value per each physical asset for each respective physical asset category; generating, based, at least in part, on the particular usage-based breakdown insurance premium value of the respective energy consuming location, at least one alert to at least one of: i) at least one service provider that services the at least one energy consuming physical asset, ii) at least one electronic device of at least one entity associated with the at least one energy consuming physical asset, iii) the at least one sensor, or iv) the at least one energy consuming physical asset; and where the at least one electronic alert is configured to affect the location-specific level of energy usage of the at least one energy consuming physical asset by at least one of: i) requiring a new usage-based breakdown insurance premium value or a change in the usage-based breakdown insurance premium value, ii) causing at least one user associated with the at least one energy consuming physical asset to change a level of energy usage of the at least one energy consuming physical asset, iii) instructing the at least one user to adjust at least one operational characteristic of the at least one energy consuming physical asset, iv)

instructing the at least one user to adjust at least one environmental characteristic of the at least one energy consuming physical asset, and v) instructing the at least one user to adjust at least sensor operational parameter of the at least one sensor.

In some embodiments, the present invention provides for a computer-implemented method that at least includes the following steps of: receiving, by a server executing insurance policy administrative application, for a pre-determined time period, (1) location, system, or equipment parameters, identifying at least one of the following parameters regarding a specific data related to at least one unit of equipment (UOE): occupancy, activity, region aggregation, spatial aggregation, facility size, system type, equipment model and any combination thereof; (2) energy usage data from at least one sensor, and (3) asset loss data; calculating, by the server executing the insurance policy administrative application, an insurance premium based on energy usage, at least in part, on a number of locations and/or assets identified in the energy usage and loss data; determining, by the server executing the insurance policy administrative application, an energy usage-based asset breakdown insurance premium for at least one facility based on a population average energy usage and the energy usage data; and generating, based, at least in part, on the energy usage-based asset breakdown insurance premium, by the server executing the insurance policy administrative application, at least one alert to at least one of: i) at least one service provider that services the at least one UOE, ii) at least one electronic device of at least one insured entity associated with the at least one UOE, iii) the at least one sensor, iv) the at least one UOE, and v) any combination thereof; and where the at least one electronic alert is configured to: i) provide information about the new insurance premium and/or the change in the insurance premium, ii) cause at least one insurer associated with the at least one UOE to affect the location specific level of energy usage of the at least one UOE, iii) include at least one instruction to adjust at least one of at least one operational parameter of the at least one UOE, and iv) include at least one instruction to adjust at least one of at least one operational parameter of the at least one sensor.

In some embodiments, the present invention provides for a computer system that at least includes the following components: a non-transient memory, electronically storing computer executable program code of an insurance policy administrative application, and at least one computer processor which, when executing the program code of the insurance policy administrative application becomes a specifically programmed computer processor configured to perform at least the following operations: receiving, for a pre-determined time period, (1) location parameters, identifying at least one of the following parameters regarding a specific location related to at least one unit of equipment (UOE): equipment model, system, occupancy, activity, region aggregation, spatial aggregation, facility size, and any combination thereof; (2) energy usage data from at least one sensor, and (3) asset loss data; calculating base lost costs based, at least in part, on a number of locations and/or facilities identified in the energy usage and loss data; determining an energy usage-based asset breakdown insurance premium for at least one facility based on the energy usage data; and generating, based, at least in part, on the energy usage-based asset breakdown insurance premium, at least one alert to at least one of: i) at least one service provider that services the at least one UOE, ii) at least one electronic device of at least one insured entity associated with the at least one UOE, iii) the at least one sensor, iv) the at least one UOE, and v) any combination thereof; and where the at least one electronic alert is configured to: i) provide information about the new insurance premium and/or the change in the insurance premium, ii) cause at least one insurer associated with the at least one UOE to affect the location specific level of energy usage of the at least one UOE, iii) include at least one instruction to adjust at least one of at least one operational parameter of the at least one UOE, and iv) include at least one instruction to adjust at least one of at least one operational parameter of the at least one sensor.

While a number of embodiments of the present invention have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any undesired steps for a particular embodiment may be eliminated).

What is claimed is:

1. A computer-implemented method, comprising:

receiving, by at least one processor, energy management data for a population of energy consuming physical assets;

determining, by the at least one processor, a respective frequency of breakdowns and a respective average severity of each breakdown based, at least in part, on the energy management data;

determining, by the at least one processor, a respective average current energy consumption value per each physical asset based, at least in part, on the energy management data;

determining, by the at least one processor, a particular usage-based breakdown estimation based, at least in part, on:

i) a number of the at least one energy consuming physical asset of the population of energy consuming physical assets and ii) the respective average current energy consumption value per each physical asset;

wherein the particular usage-based breakdown estimation comprises:

i) an estimated breakdown probability of the at least one energy consuming physical asset of the population of energy consuming physical assets, ii) an estimated time of a breakdown of the at least one energy consuming physical asset of the population of energy consuming physical assets, or iii) a combination thereof;

automatically modifying, by the at least one processor, at least one operational parameter of the at least one energy consuming physical asset of the population of energy consuming physical assets to form at least one modified energy consuming physical asset based on at least one adjustment to modify a level of energy usage associated with the at least one operational parameter; and selecting, by the at least one processor, the at least one modified energy consuming physical asset of the population of energy consuming physical assets to load into an external energy usage device based on the energy level usage associated with the at least one operational parameter meeting or exceeding a predetermined threshold of energy usage, wherein selecting the at least one modified energy consuming physical asset of the population of energy consuming physical assets comprises a determination of at least one parameter of a plurality of parameters associated with at least one sensor of a plurality of sensors that modify a physical configuration of the energy consuming physical asset, wherein the external energy usage device comprises one or more units of equipment outside of the at least one modified energy consuming physical asset.

2. The computer-implemented method of claim 1, wherein the at least one energy consuming physical asset is a physical configuration comprising one or more units of equipment (UOEs).

3. The computer-implemented method of claim 2, wherein the energy management data comprises at least one of: at least one optical parameter, at least one acoustic parameter, at least one pressure parameter, at least one temperature parameter, at least one acceleration parameter, at least one magnetic parameter, at least one biological parameter, at least one chemical parameter, or at least one motion parameter.

4. The computer-implemented method of claim 3, wherein the at least one optical parameter is selected from the group consisting of an infrared light parameter, a visible light parameter, and an ultraviolet light parameter.

5. The computer-implemented method of claim 1, wherein each respective energy consuming location is defined based on a Global Positioning System (GPS) data identifying a physical location of the at least one energy consuming physical asset.

6. The computer-implemented method of claim 1, wherein the at least one sensor is one of:
  i) a liquid pressure sensor,
  ii) a liquid flow rate sensor,
  iii) a temperature sensor,
  iv) a gas flow rate sensor,
  v) a gas pressure sensor, or
  vi) an electrical system sensor.

7. The computer-implemented method of claim 2, further comprising:
  classifying, by the at least one processor, the at least one energy consuming physical asset of a respective energy consuming location into a particular physical asset category; and
  associating, by the at least one processor, each respective energy consuming location to the particular physical asset.

8. The computer-implemented method of claim 7, wherein the classifying the at least one energy consuming physical asset of the respective energy consuming location into the particular physical asset category comprises:
  applying, by the at least one processor, at least one machine learning technique that has been trained to classify physical assets based, at least in part, on Standard Industrial Classification (SIC) codes.

9. The computer-implemented method of claim 1, wherein the energy management data comprises asset-specific historical energy consumption data and asset-specific current energy consumption data in kilowatt-hours (kwh).

10. The computer-implemented method of claim 9, further comprising:
  converting, by the at least one processor, the asset-specific historical energy consumption data and the asset-specific current energy consumption data into respective kwh amount.

11. A system, comprising:
at least one specialized computer, comprising:
  a non-transient computer memory, storing particular computer executable program code; and
  at least one computer processor which, when executing the particular program code, is configured to perform at least the following operations:
  receiving energy management data for a population of energy consuming physical assets;
  determining a respective frequency of breakdowns and a respective average severity of each breakdown based, at least in part, on the energy management data;
  determining a respective average current energy consumption value per each physical asset based, at least in part, on the energy management data;
  determining a particular usage-based breakdown estimation based, at least in part, on:
    i) a number of the at least one energy consuming physical asset of the population of energy consuming physical asset and
    ii) the respective average current energy consumption value per each physical asset;
    wherein the particular usage-based breakdown estimation comprises:
      i) an estimated breakdown probability of the at least one energy consuming physical asset of the population of energy consuming physical assets,
      ii) an estimated time of a breakdown of the at least one energy consuming physical asset of the population of energy consuming physical assets, or
      iii) a combination thereof;
  automatically modifying at least one operational parameter of the at least one energy consuming physical asset of the population of energy consuming physical assets to form at least one modified energy consuming physical asset based on at least one adjustment to modify a level of energy usage associated with the at least one operational parameter; and
  selecting at least one modified energy consuming physical asset of the population of energy consuming physical assets to load into an external energy usage device based on the energy level usage associated with the at least one operational parameter meeting or exceeding a predetermined threshold of energy usage,
    wherein selecting the at least one modified energy consuming physical asset of the population of energy consuming physical assets comprises a determination of at least one parameter of a plurality of parameters associated with at least one sensor of a plurality of sensors that modify a physical configuration of the energy consuming physical asset,
      wherein the external energy usage device comprises one or more units of equipment outside of the at least one modified energy consuming physical asset.

12. The system of claim 11, wherein the at least one energy consuming physical asset is a physical configuration comprising one or more units of equipment (UOEs).

13. The system of claim 12, wherein the energy management data comprises at least one of: at least one optical parameter, at least one acoustic parameter, at least one pressure parameter, at least one temperature parameter, at least one acceleration parameter, at least one magnetic parameter, at least one biological parameter, at least one chemical parameter, or at least one motion parameter.

14. The system of claim 13, wherein the at least one optical parameter is selected from the group consisting of an infrared light parameter, a visible light parameter, and an ultraviolet light parameter.

15. The system of claim 11, wherein each respective energy consuming location is defined based on a Global Positioning System (GPS) data identifying a physical location of the at least one energy consuming physical asset.

16. The system of claim 11, wherein the at least one sensor is one of:

i) a liquid pressure sensor, ii) a liquid flow rate sensor, iii) a temperature sensor, iv) a gas flow rate sensor, v) a gas pressure sensor, or vi) an electrical system sensor.

17. The system of claim 11, wherein the at least one computer processor which, when executing the particular program code, is further configured to perform at least the following operations, further comprises:

classifying the at least one energy consuming physical asset a respective energy consuming location into a particular physical asset category; and associating each respective energy consuming location to the particular physical asset category.

18. The system of claim 17, wherein the classifying the at least one energy consuming physical asset of the respective energy consuming location into the particular physical asset category comprises:

applying at least one machine learning technique that has been trained to classify physical assets based, at least in part, on Standard Industrial Classification (SIC) codes.

19. The system of claim 11, wherein the energy management data comprises asset-specific historical energy consumption data and asset-specific current energy consumption data in kilowatt-hours (kwh).

20. The system of claim 19, wherein the at least one computer processor, when executing the particular program code, is configured to further perform at least the following operation:

converting the asset-specific historical energy consumption data and the asset-specific current energy consumption data into respective kwh amount.

\* \* \* \* \*